United States Patent [19]
Choe

[11] Patent Number: 4,579,915
[45] Date of Patent: Apr. 1, 1986

[54] POLYBENZIMIDAZOLE POLYMERS EXHIBITING NONLINEAR OPTICAL EFFECTS

[75] Inventor: Eui W. Choe, Randolph, N.J.

[73] Assignee: Celanese Corporation, New York, N.Y.

[21] Appl. No.: 751,353

[22] Filed: Jul. 2, 1985

[51] Int. Cl.$^4$ .............................................. C08G 73/18
[52] U.S. Cl. .................................. 525/435; 528/331; 528/342
[58] Field of Search ................ 525/435; 528/342, 331

[56] References Cited
U.S. PATENT DOCUMENTS 4,154,919  5/1979  Sheratte ............................. 528/342
4,207,407  6/1980  Helminiak et al. ................. 525/435

*Primary Examiner*—Harold D. Anderson
*Attorney, Agent, or Firm*—Depaoli & O'Brien

[57] ABSTRACT

In one embodiment this invention provides a nonlinear optical substrate which comprises a transparent film of (4-nitrophenyl)-substituted poly-2,2'-(m-phenylene)-5,5'-bibenzimidazole:

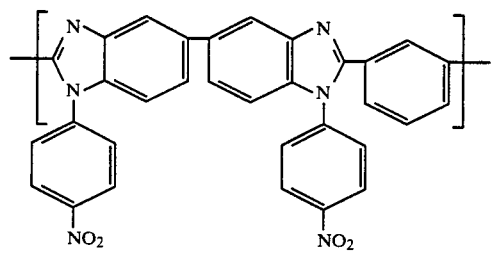

21 Claims, No Drawings

POLYBENZIMIDAZOLE POLYMERS EXHIBITING NONLINEAR OPTICAL EFFECTS

DESCRIPTION OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

One aspect of nonlinear optical organic substrate research involves the investigation of external field-induced dipolar alignment of molecules in a substrate such as a thin film. This has been demonstrated to occur for a guest dye in a polymer host when an electric field is applied to the organic mixture above the glass transition temperature of the polymer host. Noncentrosymmetric polar structures in organic crystals and molecular aggregates have been achieved in this manner. Other alignment methods are based on shear-induced uniaxial orientation of polymeric films and fibers.

Thin films of organic or polymeric materials with large second-order nonlinearities in combination with silicon-based electronic circuitry have potential as systems for laser modulation and deflection, information control in optical circuitry, and the like.

Other novel processes occurring through third-order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in organic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above-recited publications are incorporated herein by reference.

Prior art of interest with respect to the present invention are publications relating to polybenzimidazole materials, such as U.S. Pat. No. 3,174,974 U.S. Pat. No. Re. 26,065); 3,313,783; 3,408,336; 3,433,772; 3,509,108; 3,549,603; 3,555,389; 3,708,439; 4,154,919; and 4,312,976, incorporated by reference.

Of particular interest are publications which describe polybenzimidazole polymers which have been modified to provide improved properties for specific applications, such as for exposure to extreme conditions of heat and oxidation. Polybenzimidazole polymers which have been modified by substitution of reactive imidazole hydrogen sites with stable groups are described in U.S. Pat. Nos. 3,408,336; 3,524,837; 3,578,644; and 3,647,762. Similar stabilized polybenzimidazole polymers are described in J. Polymer Sci., 1(A), 1531 (1963) by Vogel et al.

There is continuing interest in the development of polybenzimidazole polymers which exhibit exceptional properties for specialized applications.

There is also growing interest in the development of new nonlinear optical organic media for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide a process for modifying polybenzimidazole polymers.

It is another object of this invention to provide novel polybenzimidazole polymers containing organic substituents in place of reactive imidazole hydrogen atoms.

It is another object of this invention to provide polybenzimidazole polymers which have nonlinear optical properties.

It is another object of this invention to provide novel nonlinear optical organic substrates.

It is another object of this invention to provide nonlinear optical organic substrates exhibiting a high $\chi^{(2)}$ and Miller's delta values.

It is another object of this invention to provide a solid phase nonlinear organic medium characterized by a high Miller's delta, and a high optical damage threshold.

It is a further object of this invention to provide a nonlinear optical substrate which comprises a noncentrosymmetric configuration of aligned polymer molecules containing repeating charge asymmetric units of conjugated polybenzimidazole structures.

Other objects and advantages of the present invention shall become apparent from the accompanying description and examples.

DESCRIPTION OF THE INVENTION

One or more objects of the present invention are accomplished by the provision of a polymeric composition which is characterized by the recurring monomeric unit:

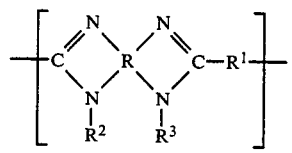

where R is a tetravalent aromatic nucleus with the nitrogen atoms forming the benzimidazole rings being paired upon adjacent carbon atoms, $R^1$ is a divalent substituent selected from aliphatic, alicyclic and aromatic radicals containing between about 2-20 carbon atoms, $R^2$ is hydrogen or $R^3$, and $R^3$ is an aromatic substituent corresponding to the formula:

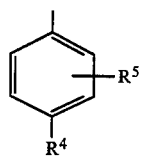

where $R^4$ is nitro, cyano or trifluoromethyl, and $R^5$ is hydrogen, alkyl, nitro, cyano or trifluoromethyl.

In another embodiment this invention provides a polymeric composition which is characterized by the recurring monomeric unit:

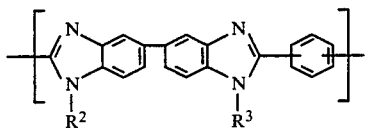

where $R^2$ is hydrogen or $R^3$, and $R^3$ is an aromatic substituent corresponding to the formula:

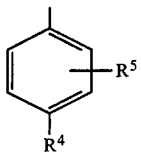

where $R^4$ is nitro, cyano or trifluoromethyl, and $R^5$ is hydrogen, alkyl, nitro, cyano or trifluoromethyl.

Illustrative of $R^5$ alkyl substituents are $C_1$–$C_{20}$ alkyl groups such as methyl, ethyl, butyl, 2-hexyl, decyl, hexadecyl, eicosyl, and the like.

In another embodiment this invention provides polymeric compositions characterized by at least one of the following recurring units:

I.
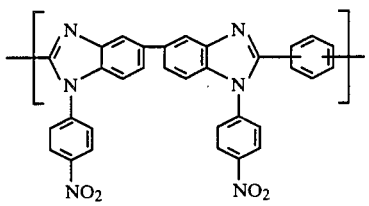

II.
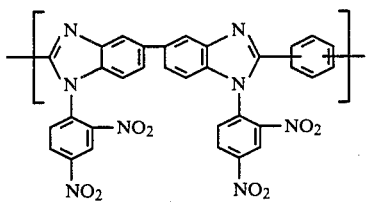

III.
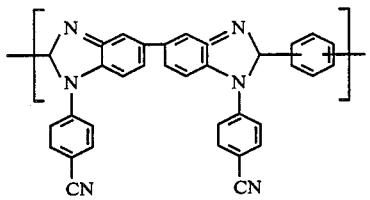

IV.
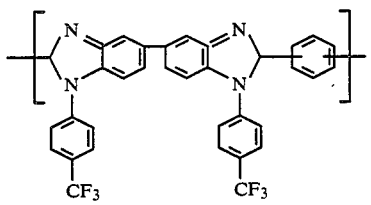

The above illustrated polymeric compositions typically exhibit an inherent viscosity between about 0.1–1.0 dl/g when measured at a concentration of 0.4 g of said polymer in 100 ml of 97 percent sulfuric acid at 25° C.

In formulae I-IV above, the reactive imidazole-hydrogen positions can be less substituted than the fully substituted forms represented in the chemical structures.

In another embodiment this invention provides a nonlinear optical medium comprising a substrate of a polymer which is characterized by the recurring monomeric unit:

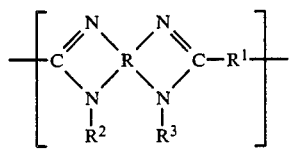

where R is a tetravalent aromatic nucleus with the nitrogen atoms forming the benzimidazole rings being paired upon adjacent carbon atoms, $R^1$ is a divalent substituent selected from aliphatic, alicyclic and aromatic radicals containing between about 2-20 carbon atoms, $R^2$ is hydrogen or $R^3$, and $R^3$ is an aromatic substituent corresponding to the formula:

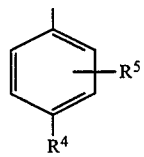

where $R^4$ is nitro, cyano or trifluoromethyl, and $R^5$ is hydrogen, alkyl, nitro, cyano or trifluoromethyl.

A nonlinear optical medium as illustrated in adapted for utility as a nonlinear optical lens component in a laser frequency converter device.

In another embodiment this invention provides a nonlinear optical medium comprising a substrate of a polymer which is characterized by the recurring unit:

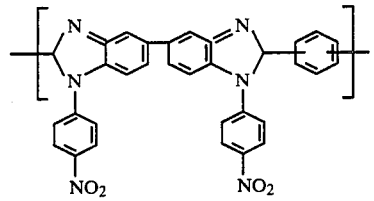

A nonlinear optical substrate as illustrated above can be in the form of a noncentrosymmetric configuration of aligned polymer molecules, and the substrate can exhibit a $\chi^{(2)}$ susceptibility of at least about $1\times10^{-6}$ esu and a Miller's delta of at least about one square meter/coulomb. A noncentrosymmetric alignment of molecules can be induced with an external field. When the polymer molecules are in a random configuration, the substrate exhibits third-order optical susceptibility $\chi^{(3)}$ harmonic response.

The term "Miller's delta" as employed herein with respect to second harmonic generation (SHG) is defined by Garito et al in Chapter 1, "Molecular Optics:-Nonlinear Optical Properties Of Organic And Polymeric Crystals"; ACS Symposium Series 233 (1983).

The quantity "delta"($\delta$) is defined by the equation:

$$d_{ijK}=\epsilon_o\chi_{ii}\chi_{jj}\chi_{kk}\delta_{ijk}$$

where terms such as $\chi_{ii}^{(1)}$ are the linear susceptibility components, and $d_{ijk}$, the second harmonic coefficient, is defined through $$\chi_{ijk}(-2\omega;\omega,\omega)=2d_{ijk}(-2\omega;\omega,\omega)$$

The Miller's delta ($10^{-2}m^2/c$ at 1.06 μm) of various nonlinear optical crystalline substrates are illustrated by KDP (3.5), LiNbO$_3$ (7.5), GaAs (1.8) and 2-methyl-4-nitroaniline (160).

The term "external field" as employed herein refers to an electric or magnetic field which is applied to a substrate of mobile organic molecules, to induce dipolar alignment of the molecules parallel to the field.

The term "optically transparent" as employed herein refers to a liquid or solid medium which is transparent or light transmitting with respect to incident fundamental light frequencies and harmonic light frequencies. In a laser frequency converter, a present invention nonlinear optical lens medium is transparent to both the incident and exit light frequencies.

The term "charge asymmetric" as employed herein refers to the dipolarity that is characteristic of organic molecules containing an electron-withdrawing group which is in conjugation with an electron-donating group.

PREPARATION OF POLYBENZIMIDAZOLE POLYMERS

In a further embodiment this invention provides a process which comprises reacting polybenzimidazole polymer with a coupling reactant in an organic solvent medium, wherein the polybenzimidazole polymer corresponds to the formula:

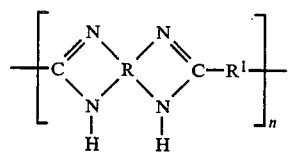

and the coupling reactant corresponds to the formula:

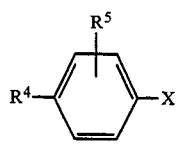

to produce a novel substituted-imidazole polybenzimidazole polymer corresponding to the formula:

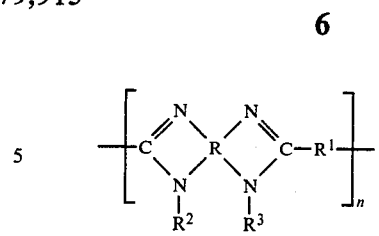

where R through $R^5$ are as previously defined, X is fluorine, chlorine, bromine or iodide, and n is an integer having a value of at least about 3.

The coupling reactant can be employed essentially in any molar quantity with respect to the polybenzimidazole starting material, and preferably is employed in at least a stoichiometric quantity with respect to the reactive imidazole hydrogen sites in the polymer. It is desirable to achieve at least about 20 percent substitution of the reactive imidazole hydrogen sites with $R^3$ substituent.

The reaction between the coupling reagent and polybenzimidazole typically is conducted at a temperature between about 75°–200° C. for a reaction period between about 1–20 hours. The reaction can be accomplished conveniently at ambient pressures.

The concentration of the polybenzimidazole and coupling reactants in the organic solvent medium is limited by the solubility of the polybenzimidazole in the solvent. Generally the polybenzimidazole concentration in the organic solvent medium will be in the range between about 1–30 weight percent, based on the total weight of the reaction medium. The molecular weight of the polybenzimidazole is a factor in determining the maximum solute weight of the polymer in the organic solvent reaction medium.

Organic solvents suitable for purposes of the synthesis process include N,N-dimethylformamide, N,N-dimethylacetamide, dimethylsulfoxide, N-methyl-2-pyrrolidone, and the like.

Preferably a catalyst such as metallic sodium, copper or zinc is employed to accelerate the coupling reaction.

The polybenzimidazole starting materials are a known class of heterocyclic polymers which are characterized by a recurring monomer unit which corresponds to the general formula illustrated above, and which can be prepared by various known processes as described in the Background Of The Invention section.

The following generalized equation illustrates the condensation reaction which occurs in forming the polybenzimidazole starting materials:

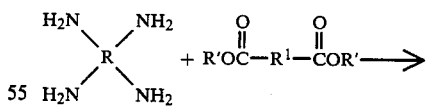

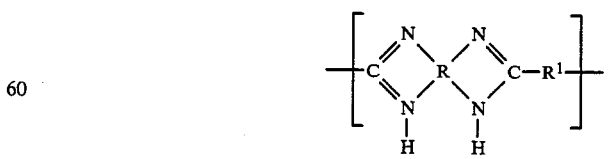

Such polybenzimidazoles are produced by the reaction of a mixture of (1) at least one aromatic tetraamine containing two groups of amine substituents, the amine substituents in each group being in an ortho position relative to each other, and (2) at least one dicarboxylate ester in which $R^1$ and $R'$ in the compound shown are substituents selected from aliphatic, alicyclic and aromatic groups.

Examples of polybenzimidazoles which have the above recurring structure include:
poly-2,2'-(m-phenylene)-5,5'-bibenzimidazole;
poly-2,2'-(pyridylene-3'',5'')-5,5'-bibenzimidazole;
poly-2,2'-(furylene-2'',5'')-5,5'-bibenzimidazole;
poly-2,2'-(naphthalene-1'',6'')-5,5'-bibenzimidazole;
poly-2,2'-(biphenylene-4'',4''')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2''-(m-phenylene)-5',5''-di(benzimidazole)propane-2,2; and
poly-2,2'-(m-phenylene)-5',5''-di(benzimidazole)ethylene-1,2.

The preferred polybenzimidazole starting material is poly-2,2'-(m-phenylene)-5,5'-bibenzimidazole as characterized by the recurring monomeric unit:

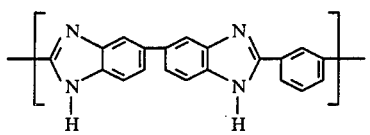

The weight average molecular weight of a typical polybenzimidazole starting material will be in the range between about 1000–150,000.

When the coupling reaction for producing a substituted polybenzimidazole of the present invention is completed, the novel polybenzimidazole product can be recovered by conventional procedures, such as by vacuum distillation of the solvent medium to provide a residual polymeric solid, or by precipitation of the polymer from the solvent medium by addition of a non-solvent such as methanol or hexane.

Alternatively, the polybenzimidazole product contained in the original solvent medium can be employed directly for fabricating substrates such as films, without an intervening recovery of the polymer in solid form.

FIELD-INDUCED MACROSCOPIC NONLINEARITY

The electronic origins of nonlinear optical effects in organic $\pi$-electronic systems is reviewed by D. J. Williams in Angew. Chem. Int. Ed. Engl., 23, 690 (1984); incorporated herein by reference.

As described in the review article, a technique has been developed for measuring $\beta$ without necesitating the incorporation of the molecule into noncentrosymmetric crystal structures. In this technique, called electric-field induced second harmonic generation (EFISH), a strong DC electric field is applied to a liquid or a solution of the molecules of interest in order to remove the orientational averaging by statistical alignment of molecular dipoles in the medium. The induced second-order nonlinearity can then produce a signal at $2\omega$, from which $\beta$ can be extracted.

A schematic diagram of experimental system for measurement of $\beta$ by the EFISH technique is presented in the review article. As illustrated in the published diagram, the 1.06 $\mu$m output of a $Nd^{3+}$:YAG laser is split and directed into a sample and a reference cell. The sample cell is translated by a stepped-motor-controlled stage across the beam. The laser pulse is synchronized with a high-voltage DC pulse to induce harmonic generation in the cell. The 0.53 $\mu$m radiation is separated from the 1.06 $\mu$m pump beam by filters and a monochromator, and the harmonic intensity is detected by a photomultiplier tube. The signal-to-noise ratio can be improved with a boxcar averager. The reference beam is directed into a crystal such as quartz, whose second-order properties are well known, so that fluctuations in beam intensity can be readily corrected in the output data. The value of the nonlinear coefficient is obtained from the ratio of the signals of the sample cell and a reference material such as quartz or $LiNbO_3$ with known $\chi^{(2)}$.

Electric field induced second harmonic generation (DCSHG) measurements of liquid solutions of $\beta$ determinations are also described by Garito et al in Phys. Rev., 28(12), 6766 (1983), incorporated by reference.

A present invention substituted-imidazole polybenzimidazole polymer is adapted to exhibit the external field-induced macroscopic nonlinearity required for second-order harmonic generation.

SOLID ORGANIC GUEST-HOST SUBSTRATES

In a further embodiment this invention provides nonlinear optically transparent host polymeric substrates having incorporated therein a distribution of guest substituted-imidazole polybenzimidazole oligomer or polymer molecules.

Illustrative of this type of optical substrate is a polymethyl methacrylate film containing a distribution of the polybenzimidazole molecules.

If the distribution of guest molecules is random, there is orientational averaging by statistical alignment of the dipolar molecules in the polymeric host, and the optical substrate exhibits third-order nonlinearity ($\chi^{(3)}$).

If the distribution of guest molecules is at least partially uniaxial in molecular orientation, then the optical substrate exhibits second order nonlinearity ($\chi^{(2)}$). One method for preparing polymeric films with large second-order nonlinear coefficients is to remove the orientational averaging of a dopant molecule with large $\beta$ by application of an external DC electric field to a softened film. This can be accomplished by heating the film above the host polymer glass-transition temperature $T_g$, then cooling the film below $T_g$ in the presence of the external field. The poling provides the alignment predicted by the Boltzmann distribution law.

The formation of a thin host polymer substrate containing guest molecules having, for example, uniaxial orthogonal molecular orientation can be achieved by inducing a dipolar alignment of the guest molecules in the substrate with an externally applied field of the type described above.

In one method a thin film of the host polymer (e.g., polymethyl methacrylate) containing guest molecules (e.g., (4-nitrophenyl)-substituted polybenzimidazole oligomer) is cast between electrode plates. The host polymer substrate then is heated to a temperature above the second-order transition temperature of the host polymer. A DC electric field is applied (e.g., at a field strength between about 400–100,000 V/cm) for a period sufficient to align the guest molecules in a unidirectional configuration parallel to the transverse field. Typically the orientation period will be in the range between about one second and one hour, as determined by factors such as guest molecular weight and field strength.

When the orientation of guest molecules is complete, the host polymer substrate is cooled below its second order transition temperature, while the substrate is still under the influence of the applied DC electric field. In this manner the uniaxial molecular orientation of guest molecules is immobilized in a rigid structure.

The uniaxial molecular orientation of the guest molecules in the host polymer substrate can be confirmed by X-ray diffraction analysis. Another method of molecular orientation measurement is by optical characterization, such as optical absorption measurements by means of a spectrophotometer with a linear polarization fixture.

The following examples are further illustrative of the present invention. The components and specific ingredients are presented as being typical, and various modifications can be derived in view of the foregoing disclosure within the scope of the invention.

EXAMPLE I

This Example illustrates the preparation of a polybenzimidazole starting material for the invention process.

Into a three-necked flask equipped with a nitrogen inlet and outlet, mechanical stirrer and a condenser are placed 23.333 g (0.1089 moles) of 3,3',4,4'-tetraaminobiphenyl, 34.67 g (0.1089 moles) of diphenylisophthalate and 0.3 g of diphenylphosphinic acid. The flask is degassed and then filled with nitrogen. The degassing is repeated at least three times. The mixture is heated rapidly with stirring to 225° C. The stirring is stopped. The temperature of the reaction mixture is then raised to 270° C. and held at that temperature for 1.5 hours. The resulting product is cooled to room temperature and then is ground.

The ground prepolymer is placed in a flask and after the degassing step is repeated the prepolymer is heated at 360° C. for one hour. The resulting poly(m-phenylenebibenzimidazole) exhibits a weight average molecular weight of 201,700 with a molecular weight distribution of 2.91 and an inherent viscosity of 1.00 dl/g when measured in a concentration of 0.4 g of the polybenzimidazole in 100 ml of 97% sulfuric acid.

A polybenzimidazole polymer as prepared above is further characterized by a Plugging Value of greater than about 0.5, and a Gardner color of less than about 10.

EXAMPLE II

This Example illustrates the preparation of a (4-nitrophenyl)-substituted polybenzimidazole polymer in accordance with the present invention.

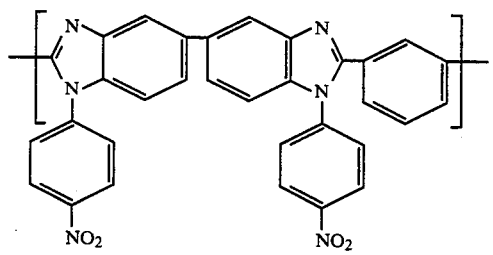

A three-necked flask equipped with a mechanical stirrer, condenser and gas inlet and outlet tube is charged with 367 g of Example I poly(m-phenylenebibenzimidazole) solution at 21% solids in N,N-dimethylacetamide, 81.93 g of 4-chloro-1-nitrobenzene, 71.87 g of potassium carbonate, 5 g of electrolytic copper dust and 300 ml of N,N-dimethylacetamide.

The reaction mixture is refluxed at 175° C. for 20 hours. The resulting reaction mixture is cooled, and poured into water to precipitate the polymer product. The product is filtered, washed with water, boiled in water, neutralized with ammonium hydroxide, washed with water and then dried at 100° C. for 16 hours to yield 96.9 grams (4-nitrophenyl)-substituted poly-2,2'-(m-phenylene)-5,5'-bibenzimidazole.

Employing the same synthesis procedure, polybenzimidazole polymers are produced in which at least 60 percent of the imidazole-hydrogen positions are substituted with 2,4-dinitrophenyl,4-cyanophenyl or 4-trifluoromethylphenyl groups.

EXAMPLE III

This Example illustrates the preparation of a thin substrate of polybenzimidazole polymer with a macroscopic noncentrosymmetric molecular orientation in accordance with the present invention.

A substituted-imidazole poly-2,2'-(m-phenylene)-5,5'-bibenzimidazole polymer as described in Example II is compression molded to form a film of about 500 micron thickness.

The molding is accomplished in a 30 Ton press (Wabash Metal Products, Inc. Model #30-1010-2TMX) with programmed heating and cooling, and adjustable pressure. The platen temperature is set at 290° C. The polymer is particulate form is placed between two Kapton (DuPont polyimide) sheets and positioned between the two platens. The platens are closed and 6 tons pressure is applied for 2 minutes. The platens are then cooled to 230° C. within thirty seconds, the pressure is released, and the film sample is retrieved from the press.

X-ray diffraction patterns from this film sample, recorded by using nickel filtered $CuK_\alpha$ radiation and flat plate photographic techniques, indicate a random orientation of polymer molecule axes.

Molecular alignment of the polymer molecule axes is achieved in the following manner. The film sample is sandwiched between two Kapton films of 0.002 inch thickness which in turn are sandwiched between two metal plates of 0.25 inch thickness, each having a ground flat surface and a rod attached to one side which serves as a contact for application of voltage in the alignment procedure. The sub-assembly is covered on top and bottom with a double layer of Kapton sheets of 0.002 inch thickness and providing a 0.004 inch electrical insulating layer against each platen.

The whole assembly is place between the platens of the press previously employed for preparing the unoriented precursor film sample. The platens are preheated to 290° C., then closed and a pressure of 6 tons is applied. Wires from a DC power supply are attached to the rods of the electrode plates and a voltage of 700 V is applied for two hours while maintaining temperature and pressure.

The press is cooled rapidly to 150° C. while pressure and voltage are maintained. At that temperature, the voltage is reduced to zero and the pressure released. The molecularly aligned film sample is retrieved from the mold, and X-ray diffraction patterns are recorded with nickel filtered CuK$_\alpha$ radiation and wide-angle photographic flat plate techniques. Orientation functions are determined utilizing a polar table and a microdensitometer interfaced with a LeCray computer.

The data demonstrate that the molecular alignment process results in a rotation of essentially all of the molecular axes of the polymer molecules out of the film plane into a direction parallel to that of the external field. This type of molecularly aligned substituted-imidazole polybenzimidazole polymer film is noncentrosymmetric and can function as a second-order harmonic-generating nonlinear optical medium for a high intensity light field to which the medium is optically clear, e.g., as the nonlinear optical component in a laser frequency converter device, with a $\chi^{(2)}$ susceptibility of at least about $1\times 10^{-6}$ esu and a Miller's delta of at least about one square meter/coulomb.

What is claimed is:

1. A polymeric composition which is characterized by the recurring monomeric unit:

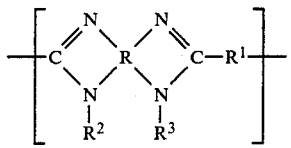

where R is a tetravalent aromatic nucleus with the nitrogen atoms forming the benzimidazole rings being paired upon adjacent carbon atoms, $R^1$ is a divalent substituent selected from aliphatic, alicyclic or aromatic radicals containing between about 2-20 carbon atoms, $R^2$ is hydrogen or $R^3$, and $R^3$ is an aromatic substituent corresponding to the formula:

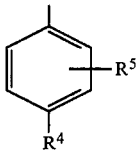

where $R^4$ is nitro, cyano or trifluoromethyl, and $R^5$ is hydrogen, alkyl, nitro, cyano or trifluoromethyl.

2. A polymeric composition in accordance with claim 1 wherein the polymer exhibits an inherent viscosity between about 0.1-1.0 dl/g when measured at a concentration of 0.4 g of said polymer in 100 ml of 97 percent sulfuric acid at 25° C.

3. A polymeric composition in accordance with claim 1 wherein $R^4$ in the aromatic substituent formula is a nitro group.

4. A polymer composition in accordance with claim 1 wherein each of $R^4$ and $R^5$ in the aromatic substituent formula is a nitro group.

5. A polymeric composition which is characterized by the recurring monomeric unit:

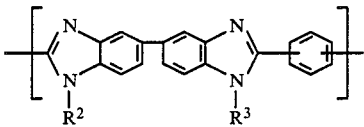

where $R^2$ is hydrogen or $R^3$, and $R^3$ is an aromatic substituent corresponding to the formula:

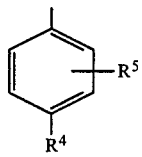

wherein $R^4$ is nitro, cyano or trifluoromethyl, and $R^5$ is hydrogen, alkyl, nitro, cyano or trifluoromethyl.

6. A polymeric composition in accordance with claim 5 wherein $R^4$ in the aromatic substituent formula is a nitro group.

7. A polymeric composition in accordance with claim 5 wherein each of $R^4$ and $R^5$ in the aromatic substituent formula is a nitro group.

8. A polymeric composition in accordance with claim 5 wherein the polymr exhibits an inherent viscosity between about 0.1-1.0 dl/g when measured at a concentration of 0.4 g of said polymer in 100 ml of 97 percent sulfuric acid at 25° C.

9. A polymeric composition which is characterized by the recurring unit:

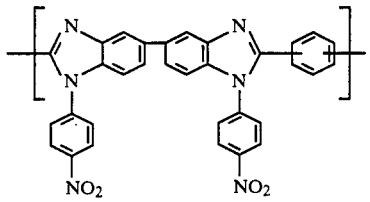

10. A polymeric composition which is characterized by the recurring unit:

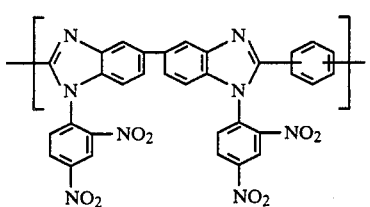

11. A polymeric composition which is characterized by the recurring unit:

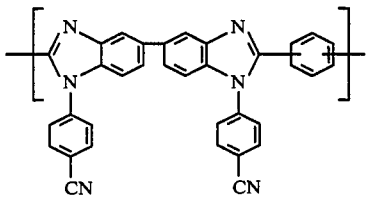

12. A polymeric composition which is characterized by the recurring unit:

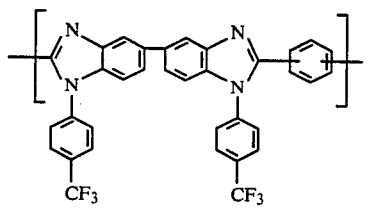

13. A nonlinear optical medium comprising a substrate of a polymer which is characterized by the recurring monomeric unit:

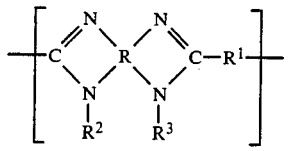

where R is a tetravalent aromatic nucleus with the nitrogen atoms forming the benzimidazole rings being paired upon adjacent carbon atoms, $R^1$ is a divalent substituent selected from aliphatic, alicyclic or aromatic radicals containing between about 2-20 carbon atoms, $R^2$ is hydrogen or $R^3$, and $R^3$ is an aromatic substituent corresponding to the formula:

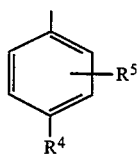

where $R^4$ is nitro, cyano or trifluoromethyl, and $R^5$ is hydrogen, alkyl, nitro, cyano or trifluoromethyl.

14. A nonlinear optical medium comprising a substrate of a polymer which is characterized by the recurring unit:

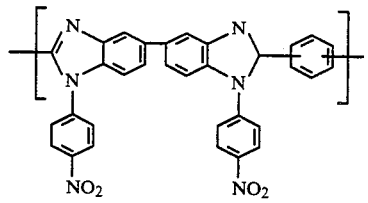

15. A nonlinear optical medium in accordance with claim 14 wherein the substrate is in the form of an optically transparent film.

16. A nonlinear optical medium in accordance with claim 14 wherein the substrate comprises a centrosymmetric configuration of randomly distributed polymer molecules.

17. A nonlinear optical medium in accordance with claim 14 wherein the substrate comprises a noncentrosymmetric configuration of aligned polymer molecules, and the substrate exhibits a $\chi^{(2)}$ susceptibility of at least about $1 \times 10^{-6}$ esu and a Miller's delta of at least about one square meter/coulomb.

18. A nonlinear optical medium in accordance with claim 17 wherein the noncentrosymmetric alignment of molecules is induced with an external field.

19. A nonlinear optical medium in accordance with claim 17 wherein the polymer molecules are aligned in a host liquid medium.

20. A nonlinear optical medium in accordance with claim 17 wherein the polymer molecules are aligned in a host solid medium.

21. A laser frequency converter device with a polymeric nonlinear optical component comprising an optically transparent medium of a polymer characterized by the recurring monomeric unit:

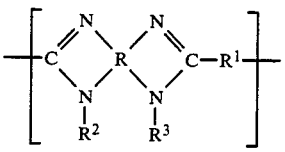

where R is a tetravalent aromatic nucleus with the nitrogen atoms forming the benzimidazole rings being paired upon adjacent carbon atoms, $R^1$ is a divalent substituent selected from aliphatic, alicyclic or aromatic radicals containing between about 2-20 carbon atoms, $R^2$ is hydrogen or $R^3$, and $R^3$ is an aromatic substituent corresponding to the formula:

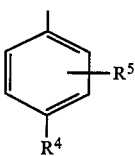

where $R^4$ is nitro, cyano or trifluoromethyl, and $R^5$ is hydrogen, alkyl, nitro, cyano or trifluoromethyl.

* * * * *